(12) United States Patent
Lippens et al.

(10) Patent No.: US 9,159,306 B2
(45) Date of Patent: Oct. 13, 2015

(54) MUSIC TEACHING DEVICE AND METHOD

(71) Applicants: André M. Lippens, Wayside, NJ (US); Luc Lippens, West Long Branch, NJ (US)

(72) Inventors: André M. Lippens, Wayside, NJ (US); Luc Lippens, West Long Branch, NJ (US)

( * ) Notice: Subject to any disclaimer, the term of this patent is extended or adjusted under 35 U.S.C. 154(b) by 0 days.

(21) Appl. No.: 14/623,898

(22) Filed: Feb. 17, 2015

(65) Prior Publication Data

US 2015/0248878 A1 Sep. 3, 2015

Related U.S. Application Data

(63) Continuation-in-part of application No. 14/032,411, filed on Sep. 20, 2013, now Pat. No. 8,987,573.

(51) Int. Cl.
*G09B 15/02* (2006.01)
*G10G 1/00* (2006.01)
*G10C 3/12* (2006.01)

(52) U.S. Cl.
CPC *G10G 1/00* (2013.01); *G09B 15/02* (2013.01); *G10C 3/12* (2013.01)

(58) Field of Classification Search
CPC ................................ G10G 1/00; G10C 3/12
See application file for complete search history.

(56) References Cited

U.S. PATENT DOCUMENTS

| | | | | |
|---|---|---|---|---|
| 119,335 A * | 9/1871 | Edgar | | 84/428 |
| 152,726 A * | 7/1874 | Cramer | | 84/428 |
| 334,484 A * | 1/1886 | Stewart | | 84/428 |
| 360,255 A * | 3/1887 | von Janko | | 84/428 |
| 474,016 A * | 5/1892 | von Janko | | 84/428 |
| 497,426 A * | 5/1893 | Decker et al. | | 84/428 |
| 682,014 A * | 9/1901 | Adams | | 84/428 |
| 1,483,380 A * | 2/1924 | Armor | | 84/483.2 |
| 1,947,686 A * | 2/1934 | Walsh | | 84/471 R |
| 2,203,393 A * | 6/1940 | Reuther | | 84/428 |
| 3,022,698 A * | 2/1962 | Lucas | | 84/423 R |
| 3,331,271 A * | 7/1967 | Glenn | | 84/478 |
| 3,468,209 A * | 9/1969 | Barreto | | 84/423 R |
| 4,054,079 A * | 10/1977 | Sohler | | 84/423 R |
| 5,404,788 A * | 4/1995 | Frix | | 84/423 R |
| 5,726,374 A * | 3/1998 | Vandervoort | | 84/638 |
| 5,741,990 A * | 4/1998 | Davies | | 84/423 R |
| 6,124,540 A * | 9/2000 | Lotito | | 84/483.2 |
| 6,566,593 B2 * | 5/2003 | Pertchik | | 84/423 R |
| 7,030,307 B2 | 4/2006 | Wedel | | |
| 7,253,349 B1 * | 8/2007 | Saltsman | | 84/424 |
| 7,439,438 B2 * | 10/2008 | Hao | | 84/483.2 |
| 8,735,706 B2 * | 5/2014 | Mathews | | 84/423 R |
| 8,987,573 B1 * | 3/2015 | Lippens et al. | | 84/478 |
| 2004/0139843 A1* | 7/2004 | Forster | | 84/483.2 |

OTHER PUBLICATIONS

Vandervoort, Paul, "The Vandervoort Keyboard: A Report from the Inventor," Contemporary Keyboard Magazine, Dec. 1976, posted in http://www.daskin.com/page5/page5.html and viewed May 12, 2015.*

* cited by examiner

*Primary Examiner* — Robert W Horn

(74) *Attorney, Agent, or Firm* — Gearhart Law LLC

(57) ABSTRACT

A novel music tablature corresponding to Janko-type keyboard with touch plates having coloring different from traditional keyboards is provided.

5 Claims, 12 Drawing Sheets

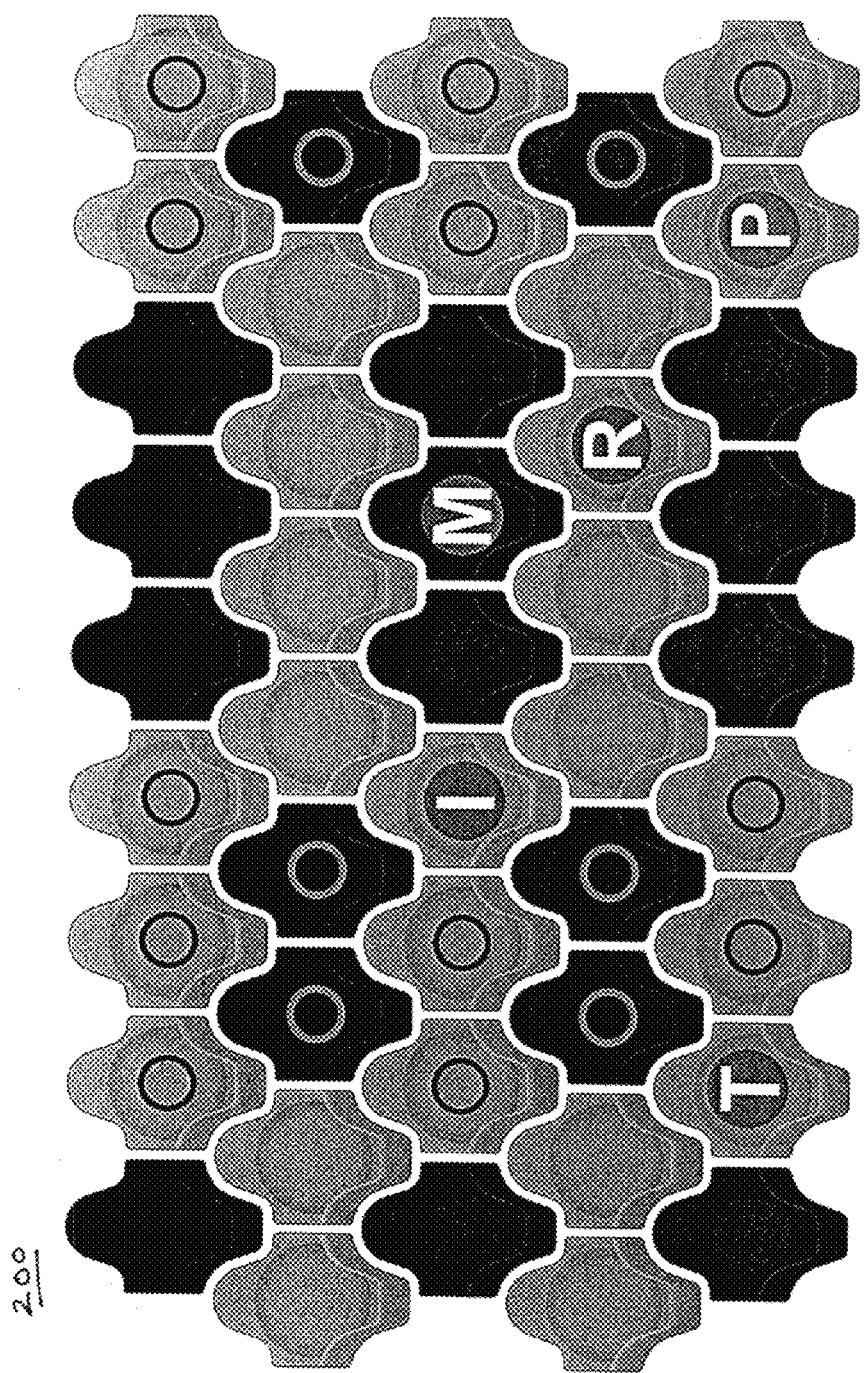

MUSIC TEACHING DEVICE AND METHOD

PRIORITY

This application is continuation in part application of U.S. patent application Ser. No. 14/032,411 which was filed on Sep. 20, 2013 and the content of which is incorporated herein by reference in entirety.

FIELD OF THE INVENTION

The invention relates to a music teaching device and method. The invention also relates to an isomorphic type keyboard, a music notation relating to the keyboard, computer programs displaying the keyboard and piano roll notation.

BACKGROUND OF THE INVENTION

The Janko-type piano keyboard, also known as isomorphic or six-six keyboard was designed by Paul von Janko in 1882. Janko Keyboard is described in for example U.S. Pat. No. 360,255.

Instead of the traditional one row of white and black keys the Janko Keyboard provides an array of keys. In the Janko Keyboard each vertical column of keys is a semitone away from its neighboring columns, and on each horizontal row of keys the interval from one note to the next is a whole step. This key layout results in each chord and scale having the same "shape" on the keyboard with the same fingerings regardless of key signatures, unlike a traditional keyboard, which requires twelve different patterns for each key signature.

The advantage of this type of keyboard is that the fingering for a given chord or tune remains the same in all key signatures. In other words the fingering remains same no matter where the chord or the tune starts on the keyboard.

The Janko Keyboard provides a set of three keys for each note allowing a player to position her hands more comfortably. Moreover, the Janko Keyboard is narrower than traditional keyboard and allows the player to reach larger intervals than with a traditional keyboard. On a Janko Keyboard keys of the same set move together through a stair like support member that the keys are attached to.

Accordingly, the Janko keyboard has several advantages and could potentially be popular for example for beginners or for children with small hands. However, regardless of its advantages the Janko Keyboards never became popular. One disadvantage of Janko type of keyboards is a feeling of busyness. It looks like there were black and white keys everywhere and this creates some confusion. Moreover, original Janko Keyboards are uncomfortable to play due to the shape and small size of the keys.

Learning to play any instrument is difficult and the use of traditional music notations is not necessarily making the task easier. Throughout the history of keyboards, there have been various teaching methods and devices to teach music. Piano rolls and self playing pianos are also known for long. During the last decades, computerized teaching methods have also become popular. One such method is described in U.S. Pat. No. 7,030,307 where a simplified note recognition technique is provided and the pitch and the duration are displayed in a single icon. The notation disclosed in U.S. Pat. No. 7,030,307 is based on a traditional piano keyboard and provides a system where the keys are clustered and each cluster is shown on the tablature as shaded or non shaded zones. Despite the benefits of this tablature it still does not provide sufficiently simple and easy way for reading music. This disclosure provides solutions to the flaws of the existing keyboards and music teaching devices by providing an improved keyboard. Furthermore, this disclosure provides a novel music tablature and piano rolls that correlate with the improved keyboard. And finally, the disclosure provides methods to use the keyboard, the tablature and the piano rolls as a teaching device through specific computer programs.

SUMMARY OF THE INVENTION

It is an object of this invention to provide a Janko-type keyboard having three to six horizontal rows, each row comprising: a multitude of touch plates attached to a support and formed by a front end, a back end, two straight sides, and a top surface in a manner that leaves a hollow cavity inside the touch plate, wherein the touch plates are widest between the two straight sides; the top surfaces having a shallow dip simulating the form of a finger tip on the widest part of the touch plate; each straight side has a tapered slot enabling stretching of the cavity to attach and detach the plates to and from the support; each front end has a narrow tip, and the front ends of adjacent touch plates form a wavelike pattern; each back end has a narrow tip, and the back ends of adjacent touch plates form a wavelike pattern; and said wavelike pattern formed by back ends matches with the wavelike pattern formed by the front ends, thereby enabling close connection of the horizontal rows.

It is another object of this invention to provide a removable touch plate of a Janko-type keyboard, wherein the touch plate comprises: a front end; a back end; two straight sides with tapered slots; a top surface; and a hollow cavity; wherein the plate is widest between the two straight sides and the front end and the bottom end have narrow tips; wherein the top surface has a shallow dip and a concave half circle toward the back end, simulating the form of a fingertip; and wherein the touch plate can be attached to a prong of a support by stretching the hollow cavity by inserting cylindrical tips of a pliers-tool into the tapered slots, inserting the support prong inside the hollow cavity and removing the pliers-tool, whereby the touch plate snaps tightly on the support prong and is held in place by friction and is removable by using the pliers-tool to stretch the cavity while sliding the plate off from the prong.

It is a further object of this invention to provide a musical tablature system for a Janko-type keyboard, said system comprising: a treble staff and a bass staff, said staves comprising at least two horizontal C-lines and a G-space in between the lines; the G-space being divided in three horizontal sections representing upper border of the G-space, middle of the G-space, and lower border of the G-space; one or more notes positioned either on the C-line, or immediately above the C line or immediately below the C line, or in middle of the G-space, or on the lower border of the G-space, or on the upper border of the G-space, said notes having an oval head or a triangular head, wherein each oval headed note on same position as the triangular headed note is half a tone lower than the triangular headed note, and wherein oval notes correspond with first, third and fifth rows of the keyboard, and the triangular headed notes correspond with second, fourth and sixth row of the keyboard; and wherein accidental notes may have a color corresponding to color of the accidental keys on the keyboard, and natural notes may have a color corresponding to the color of natural keys on the keyboard.

Yet another object of this invention is to provide a piano roll notation system for Janko-type keyboard, said system comprising: black and blue vertical lanes corresponding to the color of the touch plates of the keyboard; said lanes being lighter where the lane corresponds to a touch plate that has a marking; colored rectangles representing the notes to be played and the length of the rectangles representing duration of the notes, wherein color of notes to be played with right hand is different from color of notes to be played with left hand.

Still another object of this invention is to provide a method of teaching a user to play a Janko-type keyboard instrument, said method comprising the steps of: a) providing a computer, a touch screen showing a virtual Janko-type keyboard, and at least one computer program; b) the computer program allowing the user to choose assisted play—mode and a song or a lesson to be practiced; c) the computer program showing the song or lesson with novel tablature system of this discloser on the screen, simultaneously with the virtual keyboard; d) the computer program playing first few notes of the song or the lesson and highlighting or otherwise marking the keys played on the virtual keyboard; e) the user trying to repeat the notes played by the computer; f) the program alerting the player when a wrong note was hit; g) the computer playing next few notes when the player plays all notes correctly; and h) repeating steps d) to g) until the song is played correctly to the end.

BRIEF DESCRIPTION OF THE FIGURES

FIG. 1 shows the touch plates of the keyboard of this disclosure. A bottom view (A), a top view (B) and a side view (C) of the touch plates are shown. The measures in the figures are as follows: l: 1.25"; w: 0.875"; h: 0.875'; a: 0.15625"; b: 1.09375"; c: 0.36925"; d: 0.3495"; e: 0.375"; f: 0.75"; m: 0.355"; n: 0.445"; o: 0.625"; p: 0.5625"; q: 0.4375"; u: 0.125"; v: 0.284", $r_1$: 0.094"; $r_2$: 0.25". A skilled artisan will understand that these measures give general proportions of the touch plates but that they may be varied without diverting from the spirit of this invention.

DETAILED DESCRIPTION OF THE INVENTION

Figure 11:
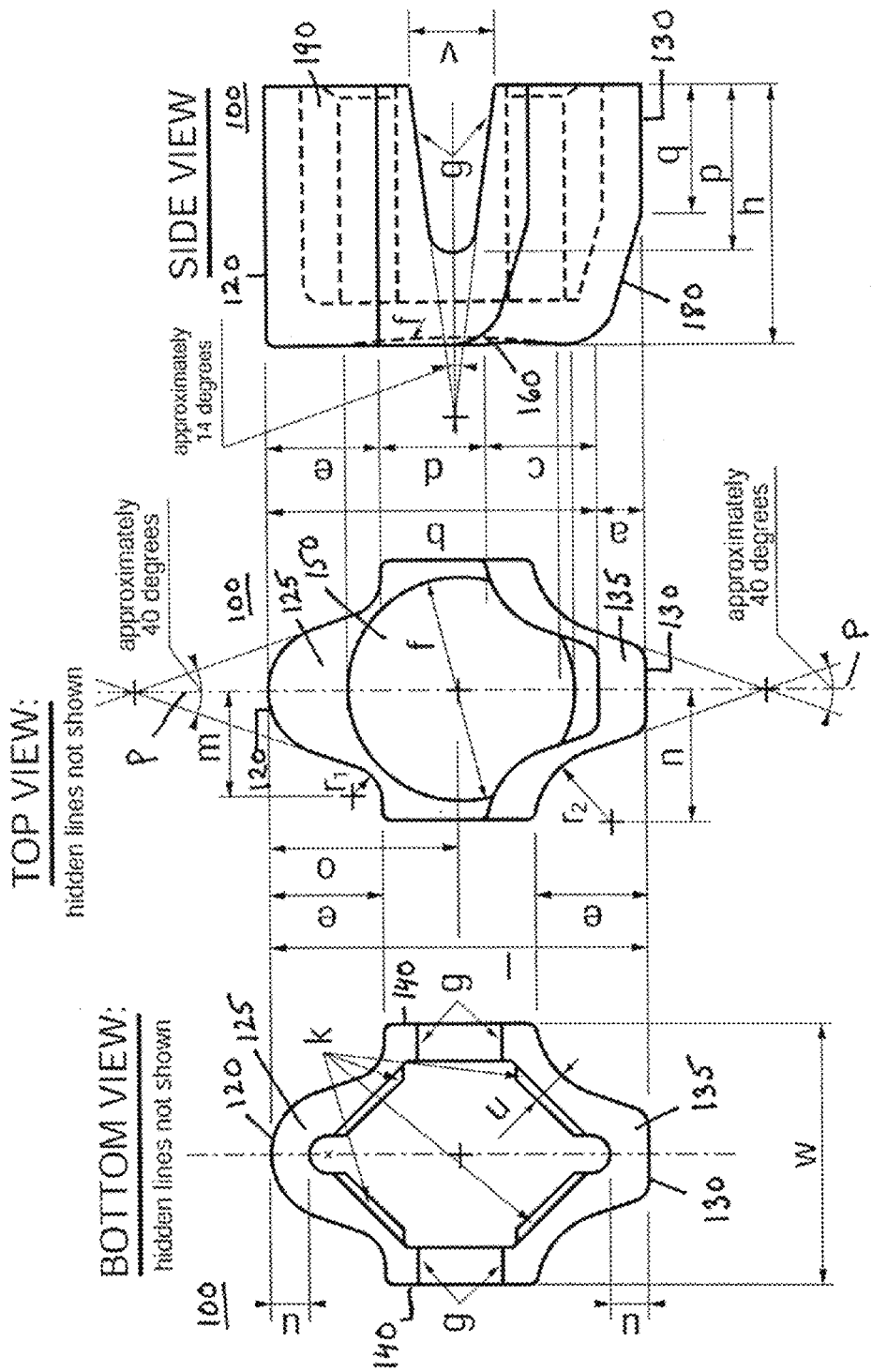
FIG. 11 shows virtual keyboard with fingering markings. T represents Thumb, I Index finger, M middle finger, R ring finger and P pinky. The color of the markings is different for left hand fingers and for right hand fingers.

This disclosure provides a novel Janko-type keyboard, music tablature and piano roll notation system relating to and correlating with the keyboard, and a method to teach music by computer programs in connection with the keyboard and/or a virtual keyboard and the related music notation and related piano roll notation.

The invention is now described by reference to the attached drawings.

The keyboard of this invention, the Lippens-keyboard, is a Janko-type keyboard with improved keys. The keys of the Lippens-keyboard have a touch plate shape that is shown in FIG. 1.

As is shown in FIG. 1, the touch plates 100 have a back end 120 and a front end 130 and two sides 140. The back end 120 and the front end 130 are curved while the sides 140 are straight. The widest part of the touch plate is between the straight sides 140. The width of the touch plate is preferably between 0.6 and 0.9 inches, more preferably between 0.8 and 0.9 inches and most preferably 0.875 inches. In the bottom view A of FIG. 1 the width is marked with letter w. The length of the touch plate is measured from the back end 120 to the front end 130 and is marked with letter 1 in the bottom view A and the top view B. The length is preferably between 1 and 1.3 inches, more preferably between 1.2 and 1.3 inches and most preferably 1.25 inches.

While the touch plate has the widest measure between the two straight sides 140, it gets narrower in the front and in the back. The narrower back tip 125 has a length that is marked in the top view B of FIG. 1 as letter e. The length is most preferably 0.375 inches. Similarly the narrower front tip 135 has a length that is marked with letter e and is most preferably 0.375 inches.

The touch plate has a top surface 150 shown in the top view B of FIG. 1. A concave curve on the top surface of the touch plate starting at the front end of the widest middle part of the touch plate morphs into a concave half circle of the widest middle part. The concave half circle simulates the form of a fingertip. A shallow dip 160 on top of the touch plate (best seen in the side view C of FIG. 1) allows the player better to orient his/her fingers on the touch plate. In the top view B of FIG. 1 letter f represents the measure of the diameter of the concave half circle. The diameter is preferably between 0.6 and 0.8 inches, more preferably 0.7 and 0.8 inches and most preferably 0.75 inches. In the front of the top surface, similarly a concave curve morphs into a straight line forming an angle of about 20 degrees with a vertical plane of symmetry of the touch plate. In the top view B of FIG. 1 the vertical plane is marked as letter P. The front end 130 forms a tip 135 that most preferably is about 5⁄16 inches wide.

The side view C of a touch plate 100 is also shown in FIG. 1. The touch plate is so designed that the front end 130 of the touch plate is heavily beveled from its front and its sides, while the back end 120 is straight. The beveled shape of the touch plate is marked with element number 180. The height of the back end of the plate is marked in the side view C of FIG. 1 with letter h. The height h is preferably between 0.6 and 0.9 inches, more preferably between 0.8 and 0.9 inches and most preferably 0.875 inches. The height of the front end of the touch plate is marked as q and it is preferably between 0.4 and 0.5 inches, more preferably between 0.425 and 0.45 inches and most preferably 0.4375 inches.

The back end 120, the front end 130, the top surface 150 and the sides 140 form together the touch plate 100 leaving a hollow cavity 190 inside the touch plate. The hollow cavity is best seen in the side view C of FIG. 1, and in FIGS. 8 and 9.

The touch plates have tapered slots (marked as letter g in the bottom view A and side view C of FIG. 1) on both straight sides 140. The slots on the sides are identical. As is shown in the side view C of FIG. 1, the tapered slots g are preferably about 0.5625 inches high (shown as letter p in the side view C of FIG. 1) and about 0.284 inches wide at their wider, lower end (shown as letter v in side view C of FIG. 1). One skilled in the art would recognize that the slots may have other dimensions too. Furthermore, the tapered slots g are so designed that when a straight line is drawn along the sides of the slot the lines will form an angle of about 14 degrees at their meeting point. This is shown in the side view C of FIG. 1. The function of the slots is discussed below in relation to FIGS. 8 and 9.

Figure 2:
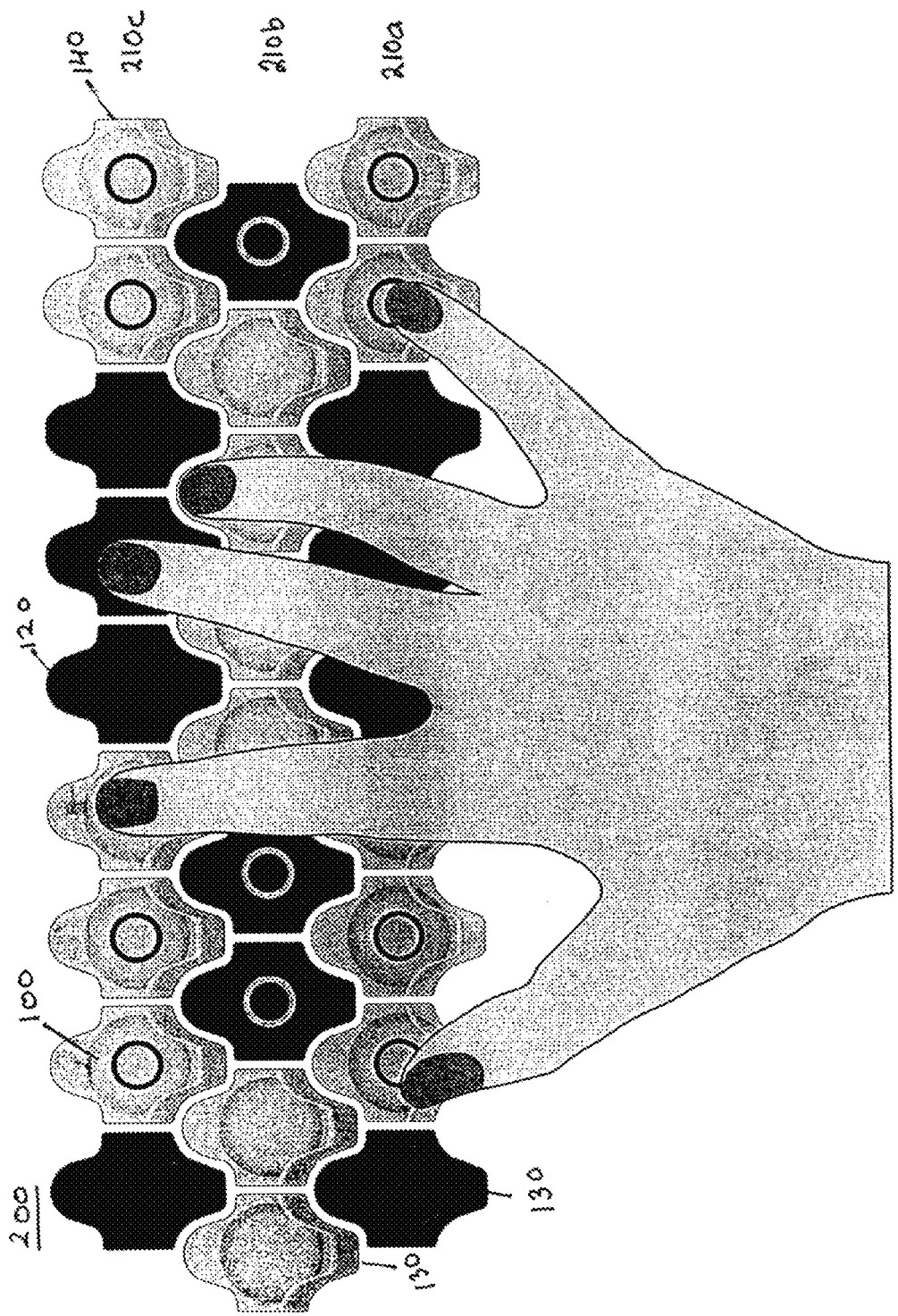
FIG. 2 shows a hand over the keyboard of this invention. Three rows of touch plates are shown.
Figure 3:
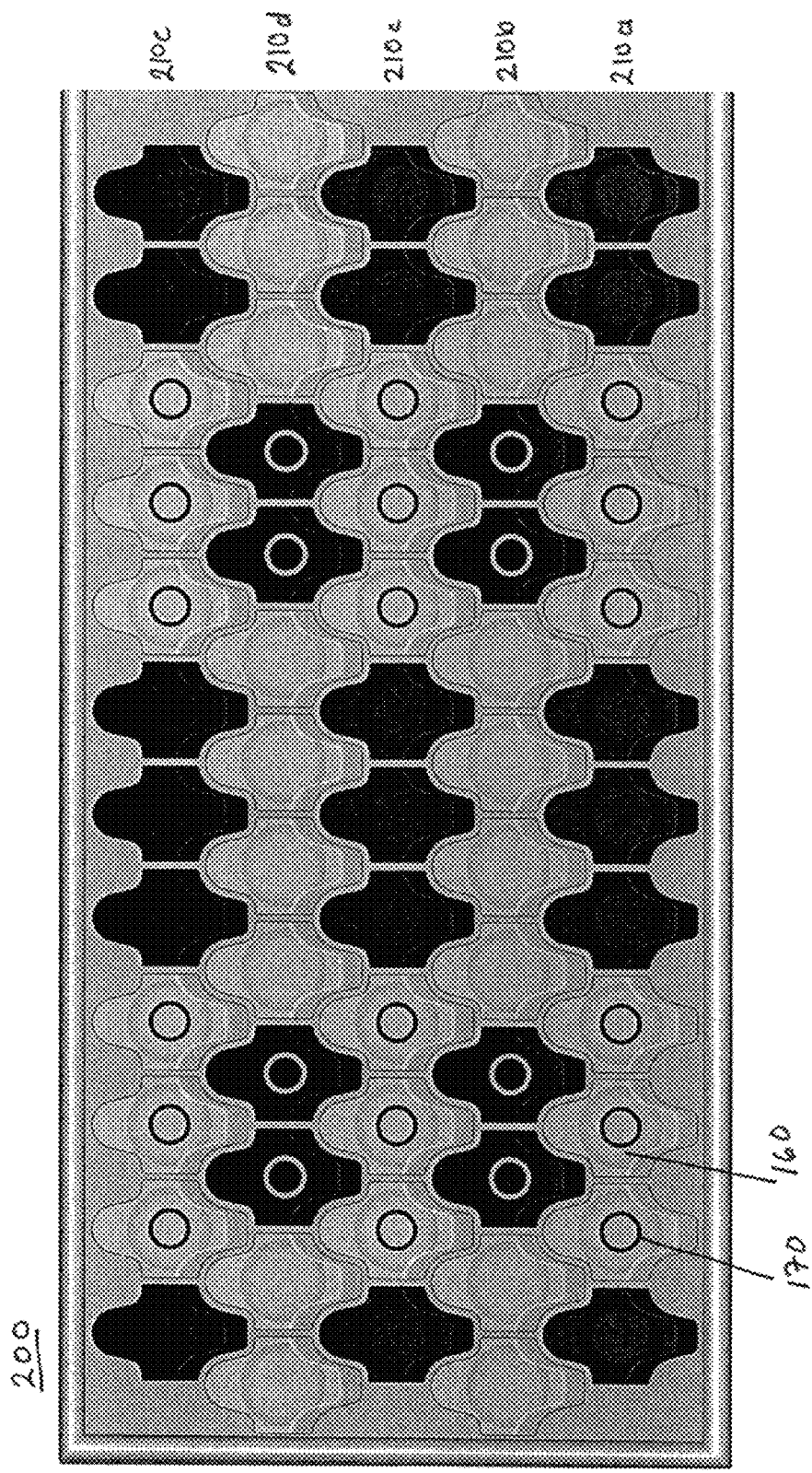
FIG. 3 shows the keyboard layout of this invention with markings on the touch plates. Five rows of touch plates are shown.

Now referring to FIGS. 2 and 3, a keyboard 200 is formed by a multitude of horizontal rows 210a, b, c of touch plates 100. There may be 4, 5 or 6 rows and most preferably 5 or 6 rows in the keyboard. Each horizontal row 210a,b,c in the keyboard is formed by a multitude of touch plates 100 being adjacent to each other from their sides 140. The back ends 120 of the adjacent touch plates of a first row 210a form a wave like configuration and the front ends 130 of the adjacent touch plates of a second row 210b form a wave like configuration perfectly matching the wave like configuration formed by the back ends 120 of the first row 210a. Similarly, the back ends 120 of the adjacent touch plates of the second row 210b form a wave like configuration and the front ends 130 of the adjacent touch plates of a third row 210c form a wave like configuration perfectly matching the wave like configuration formed by the back ends 120 of the second row 210b. In a similar manner a fourth row 210d and a fifth row 210e are formed.

Now referring to FIG. 3, the touch plates 100 are of two different colors, like in traditional keyboard or in the original Janko-keyboard: one color for natural keys and another for sharps and flats (accidental). In traditional keyboard and in the original Janko-keyboard the colors are white for naturals and black for sharps and flats. In the keyboard of this invention (Lippens keyboard) the natural keys are preferably blue (or some other color that is not in a black-gray-white continuum) and the flats and sharps black. As the figures in this application are black and white the blue color of the keys for natural notes is shown gray. The reason for changing the white color to blue is for the purpose of the correlation to the MusiScript notation and to piano roll notation as is described later below.

As is shown in FIG. 3 the Lippens-keyboard has markings 170 on the certain touch plates to help the player orient himself on the keyboard and also to distinguish the individual keys more easily. As is seen in FIG. 3, the five black keys are being separated into two groups: two with markings and three without. Similarly the seven blue (or white) keys are being separated in two groups: three with markings and four without. Furthermore, the markings 170 on the touch plates are slightly raised; preferably less than 0.010 inches in the center of the shallow dip 160. Such raised markings help any player to orient his or her fingers, but especially beneficial the raised markings are for blind players.

According to one preferred embodiment the top surface of the touch plates for natural and accidental notes are different, for instance smooth for the natural notes and slightly grainy for the accidentals.

Contrary to the original Janko-keyboard, where three keys were attached to one support element, the touch plates 100 of the Lippens-keyboard may in one preferred embodiment move independently. In an electronic version of the keyboard each touch plate in such case would actuate the synthesizer independently. In this case each touch plate would have independent contact to the synthesizer (not shown).

Figure 8:
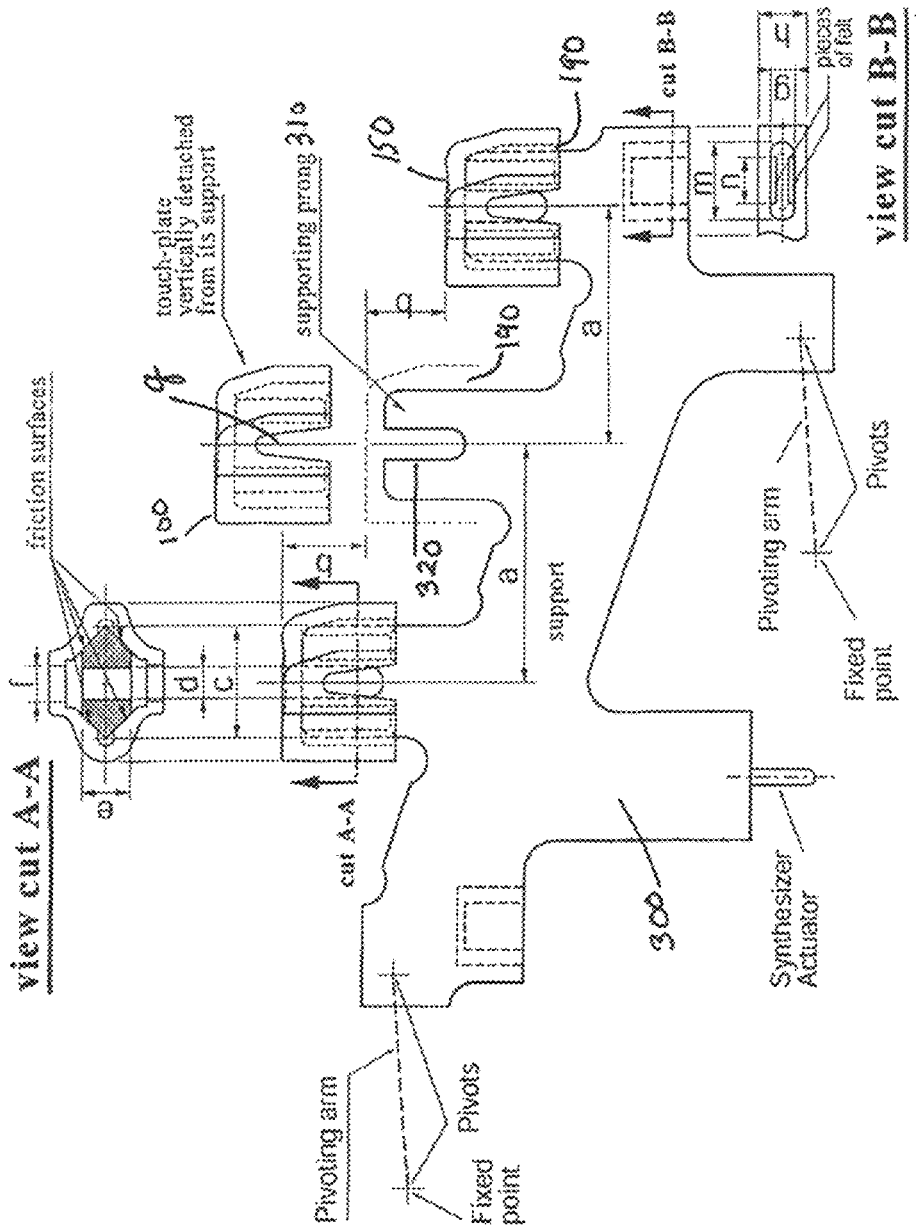
FIG. 8 shows the structure and principle of a single underlying support actuating synthesizer to move two or three touch plates simultaneously. Attachment of touch plates is also shown. The measures in the figure are as follows a: 1.875"; b: 0.625"; c: 0.875"; d: 0.250"; e: 0.375"; f: 0.282"; g: 0.187"; h: 0.375"; m: 0.625"; n: 0.375". A skilled artisan will understand that these measures give general proportions of the touch plates but that they may be varied without diverting from the spirit of this invention.
Figure 9:
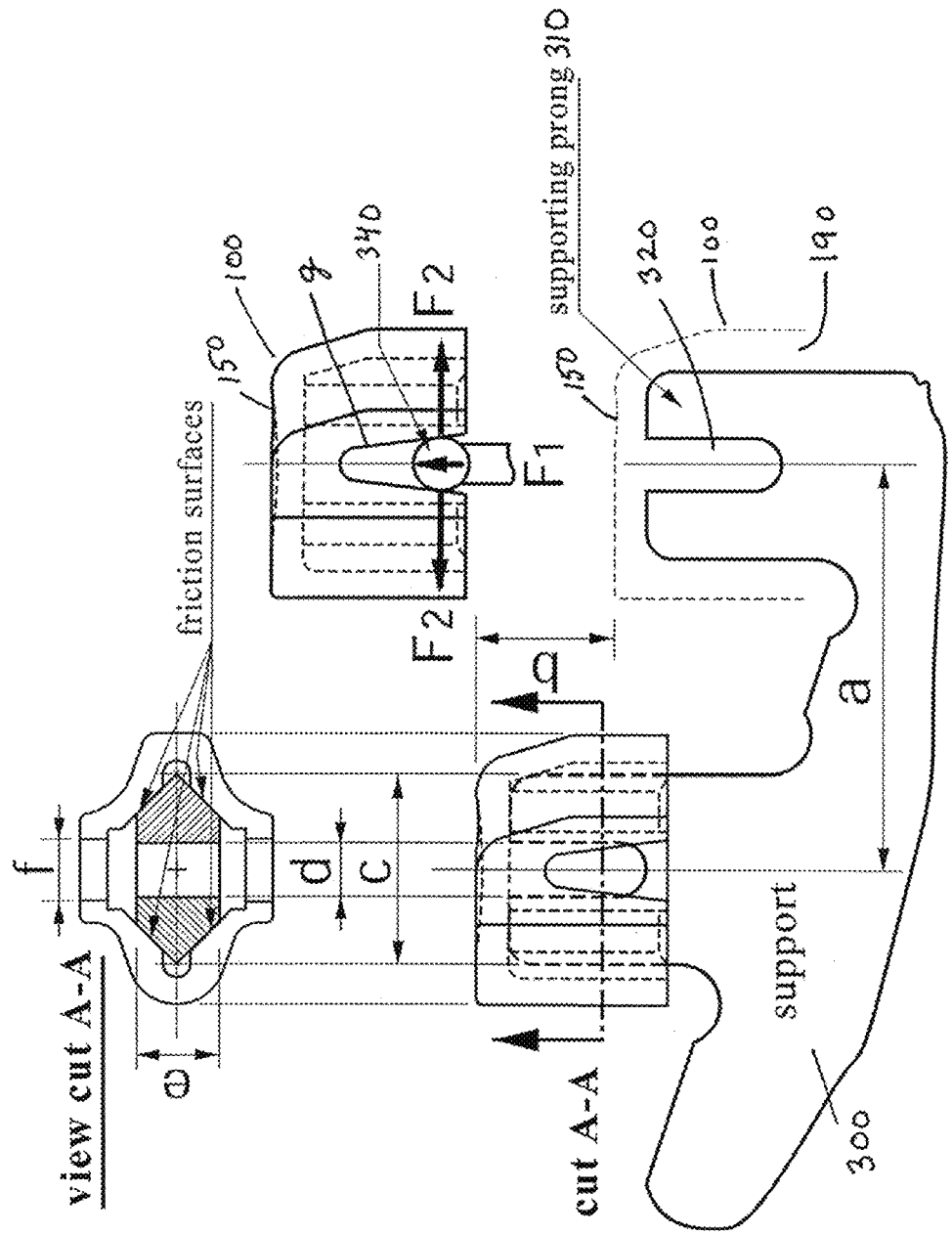
FIG. 9 shows the structure and principle of the attachment of the touch plates onto the support. The scale in the figure is 3:2.

According to another preferred embodiment shown in FIGS. 8 and 9, the touch plates Lippens-keyboard of different rows playing the same note are connected to a single underlying support 300 that actuates the synthesizer. As is shown in FIG. 8, three touch plates 100 are connected with each other via a support 300. The support 300 is a stair like support that has upward pointing prongs 310 for attachment of the touch plates 100. The prongs have preferably a vertical slit 320 on their upper end. The prongs have such measures that they snugly fit inside the cavity 190 of the touch plate when applied either by hand or with a special pliers-tool. Once on their place, the touch plates stay on the prongs by mere friction. When any one of the three touch plates is pressed the synthesizer is actuated. Accordingly, all three touch plates are played simultaneously by pressing only one of them.

Even if the idea of attaching touch plates on a support element to enable more than one key playing at same time was introduced by Janko, the Lippens-keyboard described here provides a novel and non obvious way to attach the touch plates removably on the support element.

Returning back to FIG. 1 front view (A) and side view (C), the touch plates 100 have a tapered slot g on both straight sides 140 of the touch plate. These slots allow a specially designed simple pliers tool with two cylindrical tips (not shown) to pry open the touch plate cavity 190, flexing slightly the top surface 150 of the touch plates, so that the friction surfaces shown on the cut A-A view of FIG. 8, can easily slide along the surfaces of the prongs of the support element. When the cylindrical tips of the tool are removed from the tapered slots g, the friction surfaces of the touch plate and of the support prong are pushed against each other thereby firmly holding together the touch plate to the support. This novel attachment method does not require screws, nails or anything similar to hold the touch plate to its support. This also makes the touch plates easily removable without any additional hardware. This is very practical and convenient for repair and maintenance of the keyboard.

Referring now to FIG. 9, the novel attachment system of the touch plates 100 onto the prongs 310 of the support is described further. The figure shows how the pliers are applied on the tapered slots g of the touch plate 100 to attach the plate onto the prong 310 of the support. The cylindrical tips of pliers-tool are inserted into the slots g. On FIG. 9 the pliers-tool's cylindrical tip is illustrated by element number 340. The tips 340 are pushed upward into the tapered slots with a small force illustrated as F1 in the figure. The small force F1 generates a large force F2 that pries open the cavity 190 of the touch plate by slightly flexing the top surface 150 of the touch plate. Once the cavity 190 is opened or enlarged, the touch plate 100 can be easily attached on the prong 310. Once the touch plate is pressed over the prong and the pliers are removed from the tapered slot the touch plate will be hold on its place by mere friction due to the fact that the prong snugly fits in the cavity.

Figure 4A:
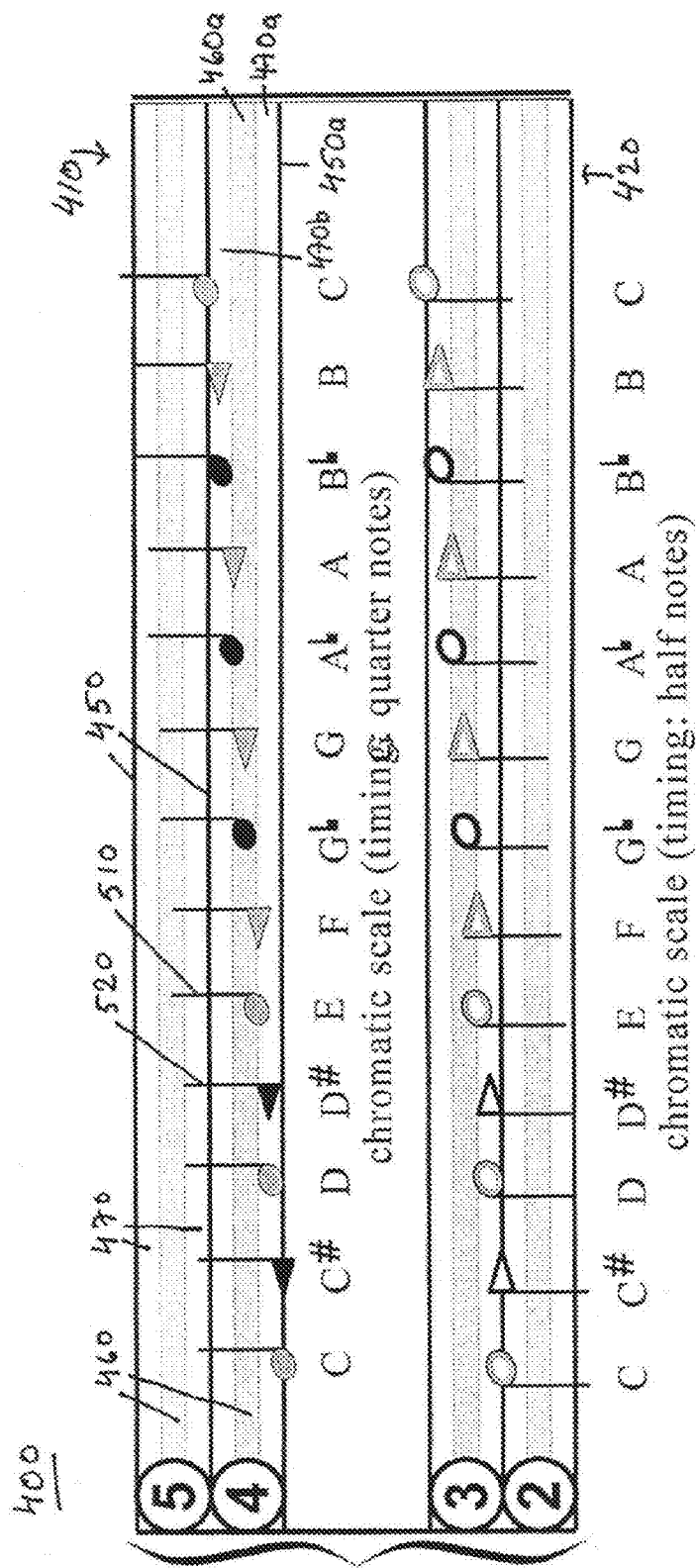
FIG. 4A shows the "MusiScript" notation relating to the keyboard. A chromatic scale is shown in quarter note and half note timings on bass and treble staves.

Now turning to the novel notation that derives from the keyboard: The novel notation of this invention is called Musi- Script and it is described below and in FIGS. 4A and 4B. FIG. 4A shows the notation grand staff 400 with treble 410 and bass 420 staves. Each octave is represented by two single features: a black C-line 450 and a slightly shaded G-space 460. The pitch of a note can be determined based only on these two features, the C-line and the G-space.

In FIG. 4A, a chromatic scale is shown on treble and bass staves. Both the treble staff and the bass staff in FIG. 4 are represented by three C-lines 450 and two gray shaded G-spaces 460. Between each C-line and each G-space there is non shaded area 470. The notes in this system have two different head shapes: an oval head 510 and a triangular flag-shaped head 520. The note with triangular head 520 is half a tone higher than the oval headed note 510 on the same line or space. Thus in the chromatic scale beginning for example from the lowest C-line 450a of the treble staff, the C-line carries the C-note (oval head) and the C-sharp (triangle head). The first G-space 460a carries in its center the G-note (triangle head) and the G-flat (oval head). Above the first C-line in the first non shaded area 470a there are D (oval) and D-sharp (triangle). On the bottom border of the first G-space there is E (oval) and F (triangle). On the upper border of the first G-space there is A-flat (oval) and A (triangle). Under the second C-line in the second non shaded area 470b there is B-flat (oval) and B (triangle) and finally on the second C-line again C (oval).

To make the notation even clearer the notes may be marked with the corresponding colors of the touch plates. In a preferred embodiment as discussed above, the keys for natural notes are blue and for flats and sharps the keys are black. Therefore, in one embodiment on the notation starting with the chromatic scale treble the oval C is blue (in black and white figures this looks gray), the triangular C-sharp is black, oval D is blue, triangular D-sharp is black, oval E is blue, triangular F is blue and so on.

Figure 4B:
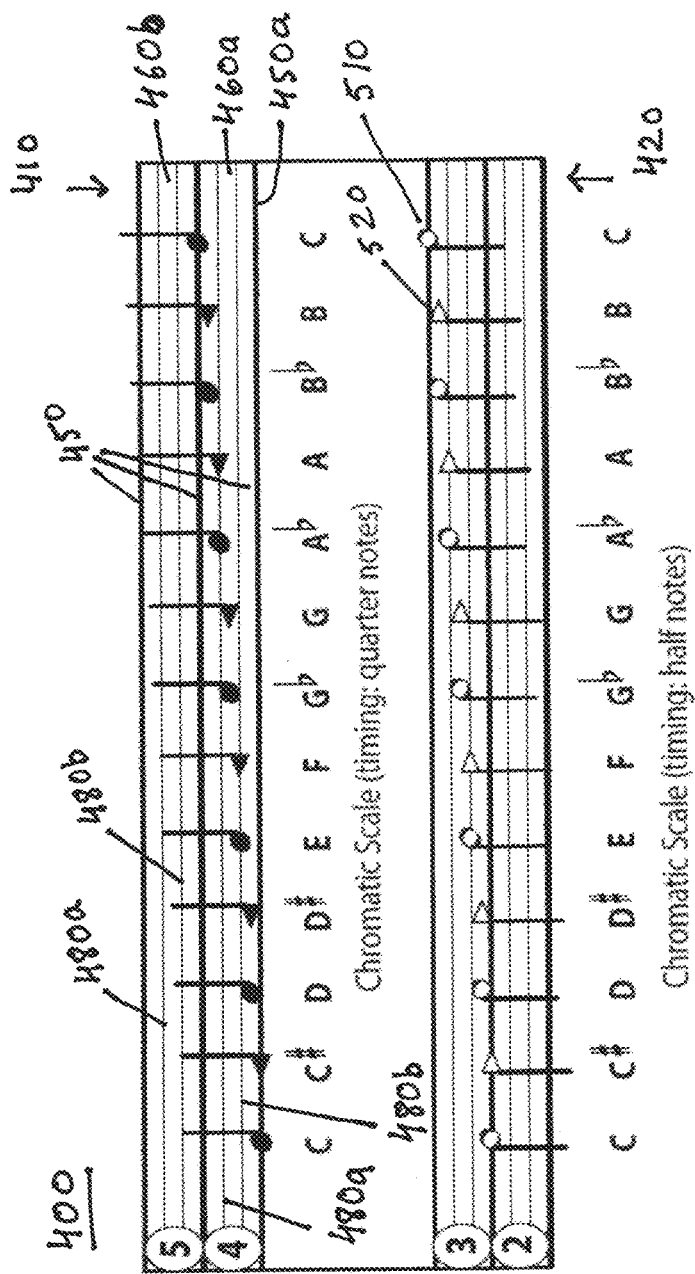
FIG. 4B shows simplified "MusiScritp" notation relating to the keyboard.

In an ideal situation the shaded space G and also the blue color that differentiate the natural notes form the accidental that are black, are two features that make it extremely easy to read Muscript; either on paper or on a computer screen. Yet it may be difficult for a person to write by hand either with a pencil or pen and a piece of paper the half tone of the G space. Therefore, an alternative representation of MusiScrpt, a "Simplified MusiScript" as shown in FIG. 4B, can be accomplished as follows:
1) Using a single color; preferably black
2) Representing the G space without shading, but instead with lines thinner or lighter than the C-line in order to make a distinction between the two lighter G space boarder lines and the darker fat C line. The skilled artisan would recognize that the differentiation could be done with any manner distinguishing the lines; all such variations are within the scope of this invention.

In FIG. 4B, a chromatic scale is shown on treble and bass staves. Both the treble staff and the bass staff in FIG. 4B are represented by three thick C-lines 450 and two lighter lines 480a and 480b in between each two C-lines 450. The two C-lines 450 and the two lighter lines 480a,b define three sections in between the C-lines. The middle section defined by two lighter lines is the G-space 460a,b. Similarly as in FIG. 4A, the notes in this system have two different head shapes: an oval head 510 and a triangular flag-shaped head 520. The note with triangular head 520 is half a tone higher than the oval headed note 510 on the same line or space. Thus in the chromatic scale beginning for example from the lowest C-line 450a of the treble staff, the C-line carries the C-note (oval head) and the C-sharp (triangle head). The first G-space 460a carries in its center the G-note (triangle head) and the G-flat (oval head). Above the first C-line there are D (oval) and D-sharp (triangle). On the bottom border of the first G-space (i.e. on the first light line 480b) there is E (oval) and F (triangle). On the upper border of the first G-space (i.e. on the second light line 480a) there is A-flat (oval) and A (triangle). Under the second C-line there is B-flat (oval) and B (triangle) and finally on the second C-line again C (oval).

Figure 5:
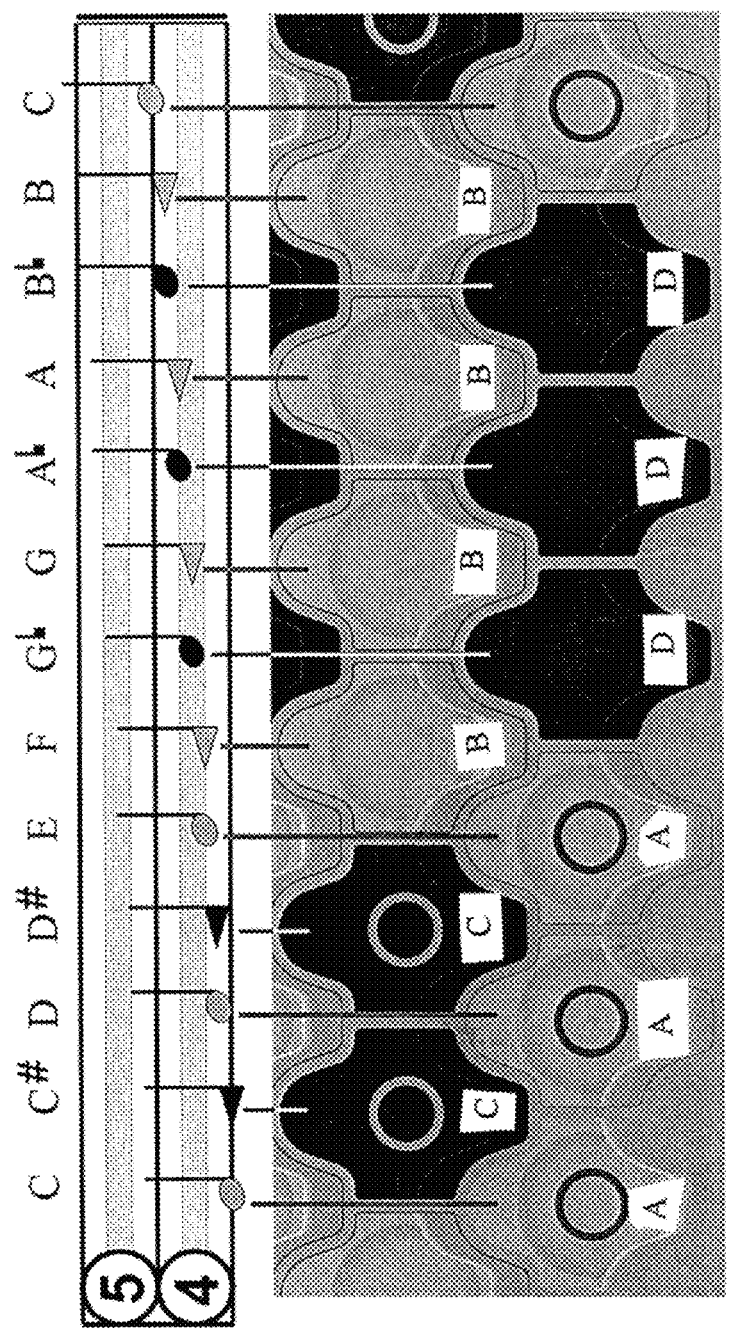
FIG. 5 shows the correlation between the Lippens Keyboard design and MusiScript notation. A chromatic scale is shown in quarter notes and each note is correlated to a keyboard touch plate.

The correlation of the notation and the keyboard design is illustrated in FIG. 5. The seven touch plates for natural notes (blue touch plates) are divided in 2 groups: one group with three touch plates and the second group with four touch plates. The members of the first group are marked with letter A in the figure. The members of the second group are marked with letter B in the figure. The five touch plates for the accidental notes are divided also into two groups, one with two touch plates and the second group with three touch plates. The two touch plates in the first group are marked with letter C in the figure and the three touch plates of the second group are marked with letter D. In the FIG. 5, the chromatic scale is shown above the keyboard. One can easily see that the blue notes correlate with blue touch plates and black notes with black touch plates. Furthermore the oval headed notes represent the touch plates on the first row (also third and fifth rows which are not shown in the figure) and the triangular headed notes represent the touch plates on the second row (as well as on rows four and six).

Figure 6:
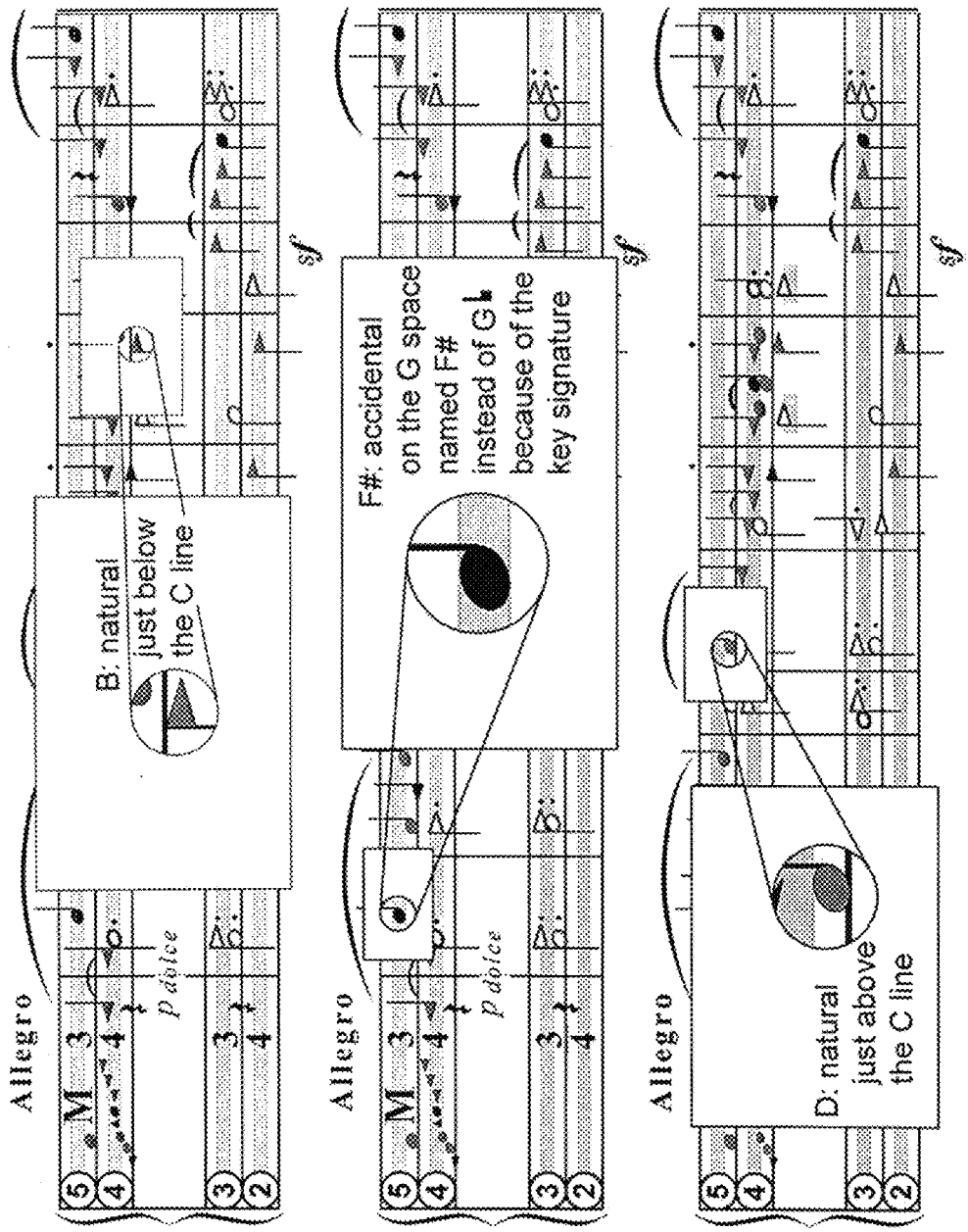
FIG. 6 illustrates how anyone of the notes on the "MusiScript" notation can be recognized without reference to any other note, line or space.

FIG. 6 represents so called Peeping Hole-test. The notation of this invention is the only one known that passes the Peeping Hole-test, which can be described as follows: if one takes a blank sheet of paper and cuts a hole in it, twice the size of a note head, then puts the sheet on top of a music sheet and passes the hole in front of any note, the notation of this invention is the only one where one can tell the name of the note in the octave just by seeing through the peeping hole. In other words, just by seeing the note having either an oval or a triangle shaped head and locating either on a C-line, on the lower boarder of the G-space, on the middle of the C-space, on the upper boarder of the G-space or under the second C-line and being blue or black, one can tell the name of the note in the octave, without any reference to any other notes or lines. For example, as is shown in the upper most peephole in the figure, there is a blue note, with triangle shaped head right under a C-line. Because it is blue, it has to be a natural note. Thus it has to be B.

Figure 10:
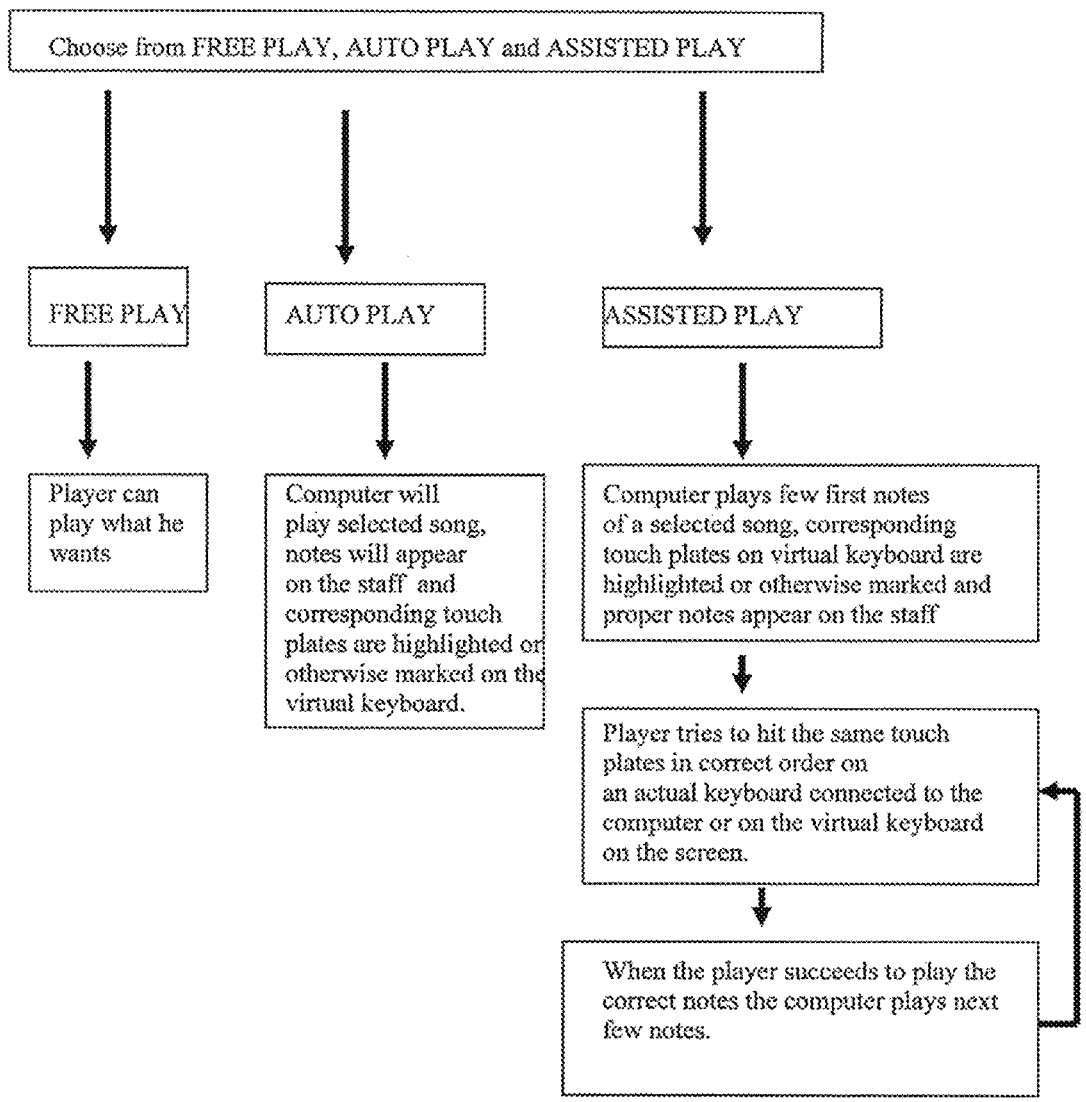
FIG. 10 is a schematic representation of the teaching system according to this invention.

The keyboard of this invention may be acoustic, electronic or it may be applied as a virtual keyboard on a computer screen. These various embodiments also allow the use of the keyboard and the notation in connection with computer programs as teaching devices as follows and as is shown in FIG. 10:

A monitor attached to a computer and possibly also to an actual keyboard, shows an image of the Lippens-keyboard at the bottom of the monitor (a virtual keyboard) and a MusiScript grand staff on top of the monitor. A command bar allows the player to choose among three modes of operation: "free play", "auto play" and "assisted play". In the free play-mode the player may play what he wants. In the auto play- and assisted play-modes, the player may choose among different songs or lessons. In the auto play-mode the computer plays the selected song and the played notes appear on the staff on upper part of the monitor and the keys that are played are highlighted, depressed or otherwise marked on the virtual keyboard on the lower part of the screen. In assisted play mode the computer plays a few notes of the chosen song or lesson while the corresponding keys on the virtual keyboard are being depressed or highlighted or otherwise marked and the proper notes appear on the staff on the upper part of the screen. The player is then invited to play the notes just played by the computer. When the player plays the proper notes either on the real keyboard that is attached to the computer or on the virtual one on a touch screen, the program progresses along and the computer plays next notes and again the notes appear on the staff and the proper keys are highlighted or otherwise marked on the virtual keyboard. Once the player plays the notes correctly the computer plays next notes and so on until the song is successfully finished by the player. In the assisted-play mode, the player has an option to choose guidance for the fingering. In that case the touch-plates of the virtual keyboard are highlighted with green spots containing the initial of the name of the finger to be used on a particular touch-plate. This is illustrated in FIG. 11 which shows how the virtual keyboard looks when the actual players hand plays on the actual keyboard the chord shown in FIG. 2. The dots containing the finger initial have different colors for the left and the right hands. For instance, green for the right hand and purple for the left hand.

The player has the option to move the action to the part of the song or the lesson where he has difficulties to overcome and repeat it as many times as needed. New songs and/or lessons with various degrees of difficulty of execution can be continuously added to the program as needed. The MusiScript notation that appears on the monitor top of the virtual Lippens-keyboard can be corrected, adjusted or modified by the program and can also be printed.

The novel teaching device of this invention contains also a second computer program and a piano roll notation. This program works with a computer connected to a touch screen displaying either the Lippens-keyboard or a conventional piano keyboard where the keys C, C-sharp, D, D sharp and E have been properly marked. The computer may additionally be connected to real electronic keyboard, either a Janko-type or a traditional type.

Figure 7:
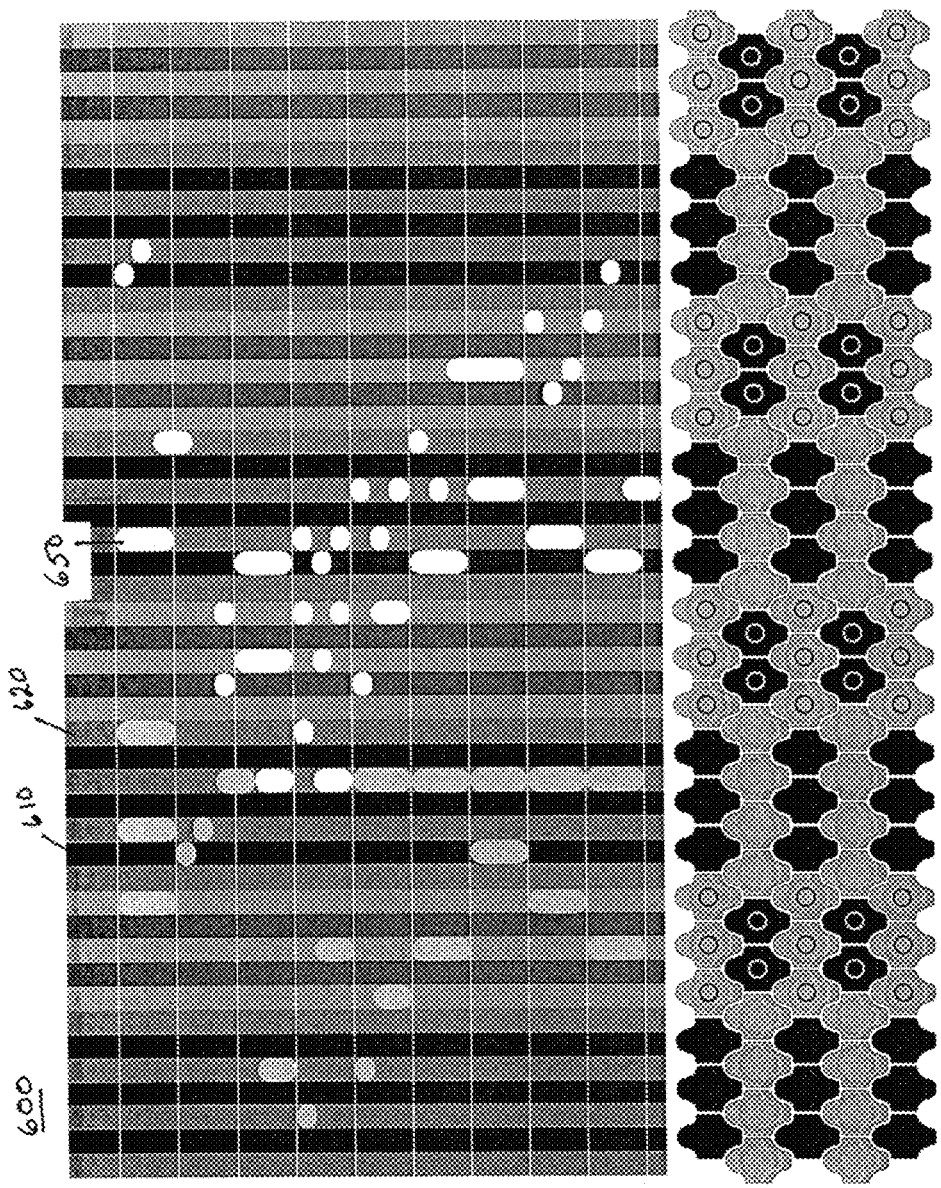
FIG. 7 illustrates piano roll notation relating to the keyboard. The keyboard is illustrated in the bottom and the piano roll on top of the figure. The music written on the piano roll is Ludwig van Beethoven's Minuet.

On top of the computer screen there is a piano roll unrolling downwards when the action takes place. The piano roll is shown in FIG. 7. The piano roll 600 is not white like a traditional piano roll, but instead it shows black 610 and blue 620 (or any other color that corresponds to the colors of the Lippens-keyboard's touch plates) vertical lanes that correspond to the touch plates of the same color on the Lippens-keyboard. Where the marking 170 (see FIG. 3) appear on the Lippens-keyboard, the black lanes and blue lanes on the roll appear lighter, gray instead of black and light blue instead of dark blue (this is one of the reasons why the natural notes on the Lippens-keyboard cannot be white as in traditional piano keyboard).

In the piano roll 600, the notes to be played are represented by light colored rectangles 650 coming down from the upper part of the screen toward the virtual keyboard at the bottom of the screen while the computer plays the notes. The length of the rectangles represent the duration of the note. The front and back of the rectangles are rounded in order to mark the beginning and the end of the duration of the notes. The colors of the rectangles are different for the right hand and the left hand of the player; for example white for the right hand and tan for the left had.

The command line of the computer screen allows the player to use different modes, either auto play or assisted play. In the auto play mode the computer plays the notes and the piano roll opens on the upper part of the screen. In the assisted play mode the player can choose a song or lesson and determine the speed at which the notes come down (piano roll opens); he can also shift the action on the roll where he experiences difficulties that the needs to overcome. Similarly as is explained above in relation to FIG. 10, here too the player tries to play the correct notes either on the virtual keyboard or on the actual keyboard that is attached to the computer. When the player hits a wrong key either on the real keyboard or the virtual keyboard, the wrongly played key on the virtual keyboard will be marked for example with a red dot or light. The program can accept additional songs or lessons as needed.

It is understood by one skilled in the art that the invention is described above by way of example and that there are variations that may be made without diverting from the spirit of this invention.

What is claimed is:

1. A musical tablature system for a Janko-type keyboard having three to six horizontal rows each comprising multitude of touch plates and wherein touch plates for natural notes are colored with one color and touch plates for accidental notes are colored with another color, said system comprising:
    a treble staff and a bass staff, said staves comprising at least two horizontal C-lines and a G-space in between the lines;
    the G-space being divided in three horizontal sections representing upper border of the G-space immediately below the C-line, middle part of the G-space and lower border of the G-space immediately above of the C-line; and
    one or more notes positioned either on the C-line, in the middle part of the G-space, on the lower border of the G-space, or on the upper border of the G-space, said notes having an oval head or a triangular head, wherein each oval headed note on same position as the triangular headed note is half a tone lower than the triangular headed note, and wherein oval notes correspond with first, third and fifth rows of the keyboard, and the triangular headed notes correspond with second, fourth and sixth row of the keyboard.

2. The tablature system of claim 1, wherein accidental notes have a color corresponding to color of the accidental keys on the keyboard, and natural notes have a color corresponding with the color of natural keys on the keyboard.

3. The musical tablature of claim 1, wherein the staves have three C-lines and two G-spaces.

4. The musical tablature of claim 2, wherein natural notes are blue and accidental notes are black.

5. The musical tablature of claim 1, wherein the C-lines are thicker than lines dividing the G-spaces to three sections.

* * * * *